United States Patent [19]

Hibi et al.

[11] Patent Number: 5,871,707
[45] Date of Patent: *Feb. 16, 1999

[54] PROCESS FOR PRODUCING CHLORINE

[75] Inventors: Takuo Hibi; Hiroshi Nishida; Hiroaki Abekawa, all of Chiba, Japan

[73] Assignee: Sumitomo Chemical Company, Limited, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 648,976

[22] Filed: May 17, 1996

[30] Foreign Application Priority Data

May 18, 1995 [JP] Japan .................................... 7-119866
Jun. 23, 1995 [JP] Japan .................................... 7-157959

[51] Int. Cl.$^6$ ........................................................ C01B 7/04
[52] U.S. Cl. ........................................... 423/502; 423/507
[58] Field of Search ...................................... 423/502, 507

[56] References Cited

U.S. PATENT DOCUMENTS

| | | | |
|---|---|---|---|
| 2,204,733 | 6/1940 | Miller | 423/502 |
| 3,760,067 | 9/1973 | Ingwalson | 423/502 |
| 3,769,391 | 10/1973 | Ninane et al. | 423/502 |
| 4,123,389 | 10/1978 | Pieters et al. | 252/441 |
| 4,311,568 | 1/1982 | Balko | 205/621 |
| 4,394,367 | 7/1983 | Foster | 423/502 |

FOREIGN PATENT DOCUMENTS

| | | |
|---|---|---|
| 0184413 | 6/1986 | European Pat. Off. . |
| 0272332 | 6/1988 | European Pat. Off. . |
| 043290 | 6/1991 | European Pat. Off. . |
| 0465243 | 1/1992 | European Pat. Off. . |
| 1 567 788 | 7/1973 | Germany . |
| 4336404 | 9/1994 | Germany . |
| 44-5692 | 3/1944 | Japan . |
| 43-805 | 1/1968 | Japan ..................................... 423/507 |
| 48-29038 | 9/1973 | Japan . |
| 49-15560 | 4/1974 | Japan . |
| 52-5473 | 2/1977 | Japan . |
| 62-153103 | 7/1987 | Japan . |
| 62-241804 | 10/1987 | Japan . |
| 62-270405 | 11/1987 | Japan . |
| 1046313 | 10/1966 | United Kingdom ................... 423/240 |
| 2120225 | 11/1983 | United Kingdom . |
| 2229430 | 9/1990 | United Kingdom . |
| 91/06505 | 5/1991 | WIPO . |

OTHER PUBLICATIONS

Patent Abstracts of Japan, vol. 12, No. 155 (C–494), May 12, 1988 (JP–A–62 270405).

Chemical Abstracts, vol. 111, No. 20, May 14, 1990, Columbus, Ohio, Abstract No. 182361e, XP002008517 (JP–A–01 257 102).

T. Kiyoura et al., "Recovery of chlorine from hydrogen chloride", *Catalysis Society of Japan*, vol. 33, No. 1, 1991, pp. 15–20. (No month).

T. Kiyoura et al., "Catalytic Oxidation of Hydrogen Chloride on Chromia", *Nippon Kagaku Kaishi*, vol. 9, 1987, pp. 1672–1677. (No month).

English lanuage Abstract of Russian Patent Publication No. SU 132633, Jul. 1987.

English language Abstract of Russian Patent Publication No. SU 331649, Nov. 1976.

English language Abstract of Russian Patent Publication No. SU 517560, Jun. 1976.

*Primary Examiner*—Ngoc-yen Nguyen
*Attorney, Agent, or Firm*—Sughrue, Mion, Zinn, Macpeak & Seas, PLLC

[57] ABSTRACT

The present invention provides a process for producing chlorine by oxidation of hydrogen chloride with oxygen which process comprises using a ruthenium catalyst.

33 Claims, No Drawings

PROCESS FOR PRODUCING CHLORINE

FIELD OF THE INVENTION

The present invention relates to a process for producing chlorine. More particularly, it relates to a process for producing chlorine, comprising oxidation of hydrogen chloride, which makes it possible to produce chlorine at a lower reaction temperature using a smaller amount of catalyst having high activity.

BACKGROUND OF THE INVENTION

It is known that chlorine is useful as a raw material of vinyl chloride, phosgene, etc., and can be produced by oxidation of hydrogen chloride. In Japanese Patent Kokai (Laid-Open) No. 62-270405, for example, a process for producing chlorine comprising oxidation of hydrogen chloride using a chromium oxide catalyst is described. However, the process which has hitherto been known has the problem that the catalyst activity is insufficient, and it has been desired to develop a catalyst having high activity, which can be used for the oxidation reaction of hydrogen chloride.

When using a supported ruthenium catalyst for a general oxidation reaction with oxygen, ruthenium in the high oxidation state was sometimes volatilized at an elevated temperature. Therefore, it has hitherto been considered difficult to use the supported ruthenium catalyst for that reaction. The present inventors have found first that the ruthenium catalyst shows high activity when using it for the reaction for producing chlorine by oxidation of hydrogen chloride, and have studied more intensively. Thus the present invention has been completed.

OBJECTS OF THE INVENTION

That is, a main object of the present invention is to provide a process for producing chlorine, comprising oxidation of hydrogen chloride, which makes it possible to produce chlorine at a lower reaction temperature using smaller amount of a catalyst having high activity.

This object as well as other objects and advantages of the present invention will becomes apparent to those skilled in the art from the following description.

SUMMARY OF THE INVENTION

That is, the present invention provides a process for producing chlorine by oxidation of hydrogen chloride with oxygen which process comprises using a ruthenium catalyst.

DETAILED DESCRIPTION OF THE INVENTION

The ruthenium catalyst used for the present invention means a catalyst containing at least ruthenium or a ruthenium compound, and examples thereof include commercially available supported ruthenium catalyst, ruthenium oxide catalyst, catalyst obtained by supporting a ruthenium compound on a carrier, ruthenium mixed oxide catalyst, ruthenium black, etc.

Examples of the supported catalyst include supported metal ruthenium catalyst etc. which are prepared by supporting on a carrier such as alumina, silica, silica alumina, zeolite, diatomaceous earth, oxide and mixed oxide of elements (e.g. titanium oxide, zirconium oxide, vanadium oxide, etc.), metal sulfate, etc. according to a known process (see Shokubai Kouza, Shokubai Jikken Handbook, 1986, page 20, published by Kodan-sha). Commercially available catalysts can also be used. The carrier used for the supported catalyst is not specifically limited, and there can be preferably used titanium oxide, alumina, zirconium oxide, zeolite, silica, titanium composite oxide, zirconium composite oxide and aluminum composite oxide, more preferably titanium oxide, zirconium oxide and alumina.

The ratio of ruthenium to the carrier is preferably from 0.1 to 20% by weight, more preferably from 1 to 5% by weight. A third component other than ruthenium can also be added, and examples of the third component include palladium compound, copper compound, chromium compound, vanadium compound, alkali metal compound, rare earth compound, manganese compound, alkaline earth compound, etc. The amount of the third component added is usually from 0.1 to 10% by weight based on the carrier.

A supported ruthenium catalyst can be used after reduction of the catalyst or after oxidation of it.

Examples of the ruthenium oxide catalyst include ruthenium oxides such as ruthenium dioxide, ruthenium hydroxide etc., a ruthenium dioxide catalyst and ruthenium hydroxide catalyst etc. according to a known method (see Gensobetsu Shokubai Binran, 1978, page 544, published by Chijinkan). Commercially available ruthenium dioxide can also be used. The ruthenium oxide compound such as halogenated ruthenium oxide, in which ruthenium and other elements are combined, are also used.

As the preparation method of ruthenium dioxide, for example, there is a method comprising adding an alkali to an aqueous solution of $RuCl_3$, precipitating ruthenium hydroxide, washing the precipitate, followed by calcining in the air.

A catalyst obtained by supporting ruthenium oxide on a carrier is preferably used. Examples of the carrier include oxide and mixed oxide of elements (e.g. titanium oxide, alumina, zirconium oxide, silica, titanium mixed oxide, zirconium mixed oxide, aluminum mixed oxide, silicon mixed oxide etc.) The weight ratio of (ruthenium oxide)/(the carrier) is usually 0.1/99.9 to 70/30. Examples of the supporting compounds include ruthenium oxide, ruthenium hydroxide, halogenated ruthenium oxide. As the supporting method of ruthenium oxide, for example, there is a method comprising impregnating the carrier with an aqueous solution of $RuCl_3$, adding an alkali, precipitating ruthenium hydroxide on the carrier, washing it with water, followed by calcining in the air. As the other example, there is a method comprising inpregnating the carrier with an aqueous solution of $RuCl_3$, drying, followed by oxydative decomposition under the calcination in the air. The supported catalyst is usually calcined at 100° C. to 500° C. for about 30 minutes to 5 hours.

Examples of the catalyst prepared by supporting the ruthenium compound on the carrier include catalysts prepared by supporting compounds such as ruthenium chloride (e.g. $RuCl_3$, $RuCl_3$ hydrate, etc.), salt of chlororuthenate (e.g. $K_3RuCl_6$, $[RuCl_6]^{3-}$, $K_2RuCl_6$, etc.), salt of chlororuthenate hydrate (e.g. $[RuCl_5(H_2O)]^{2-}$, $[RuCl_2(H_2O)_4]^+$, etc.), ruthenium oxide (e.g. $RuO_2$, $RuO_4$, etc.), salt of ruthenic acid (e.g. $K_2RuO_4$, etc.), ruthenium oxychloride (e.g. $Ru_2OCl_4$, $Ru_2OCl_5$, $Ru_2OCl_6$, etc.), salt of ruthenium oxychloride (e.g. $K_2Ru_2OCl_{10}$, $CS_2Ru_2Cl_4$, etc.), ruthenium hydroxide, ruthenium-amine complex (e.g. $[Ru(NH_3)_6]^{2+}$, $[Ru(NH_3)_6]^{3+}$, $[RU(NH_3)_5H_2O]^{2+}$, etc.), chloride of ruthenium-amine complex (e.g. $[Ru(NH_3)_5Cl]^{2+}$, $[Ru(NH_3)_6]Cl_2$, $[Ru(NH_3)_6]Cl_3$, etc.), ruthenium bromide (e.g. $RuBr_3$, $RuBr_3$ hydrate, etc.), other ruthenium-organic amine complex, ruthenium-acetyl acetonate complex, ruthenium-carbonyl complex (e.g. $Ru(CO)_5$, $Ru_3(CO)_{12}$, etc.), salt of ruthenium organic acid (e.g. $Ru_2(RCOO)_4Cl$ (R=alkyl group), etc.), ruthenium-nitrosyl complex, ruthenium-phosphine complex, etc. on carriers such as alumina, silica, silica alumina, zeolite, diatomaceous earth, oxide and mixed oxide of elements (e.g. titanium oxide, zirconium oxide, vanadium oxide, etc.), metal sulfate, etc. Two or more sorts of these carriers may be used in combination. As the ruthenium compound, ruthenium chloride, ruthenium chloride-amine complex and ruthenium-carbonyl complex are preferred. As the carrier, titanium oxide, zirconium oxide, alumina, silica, titanium mixed oxide, zirconium mixed oxide and aluminum mixed oxide are preferably used. Among them, titanium oxide, alumina, zirconium oxide and silica are particularly preferred.

Additional examples of the catalyst include a catalyst obtained by calcining the above catalyst, followed by chemically-mixing with the carrier, a catalyst subjected to a reducing treatment and a catalyst subjected to an oxidizing treatment.

The ratio of the ruthenium compound to the carrier is usually from 0.1 to 20% by weight, preferably from 1 to 10% by weight. A third component other than the ruthenium compound can also be added, and examples of the third component include a palladium compound, a copper compound, a chromium compound, a vanadium compound, an alkali metal compound, a rare earth compound, a manganese compound, an alkaline earth compound, etc. The amount of the third component added is usually from 0.1 to 10% by weight based on the carrier. Examples of the supporting process include impregnation process, precipitation supporting process, coprecipitation process, mixing process, etc. Among them, the impregnation process is preferred.

As the impregnation process, for example, there is a process comprising suspending a carrier in a solution, which is prepared by dissolving a ruthenium compound in a solvent, evaporating the solvent, followed by drying and further calcining. Examples of the solvent include water, methanol, organic solvent, etc.

The supported catalyst is usually calcined at 100° to 500° C. for about 30 minutes to 5 hours.

The catalyst according to the method for preparing the ruthenium mixed oxide is obtained by chemically-mixing at least one oxide selected from oxides such as titanium oxide, zirconium oxide, alumina, silica, vanadium oxide, boron oxide, chromium oxide, niobium oxide, hafnium oxide, tantalum oxide, tungsten oxide, etc. with ruthenium oxide. The compound for chemically-mixing with ruthenium oxide is not limited to the above compounds, and various mixed oxides such as copper chromite, etc. are also used. As the process for chemically-mixing ruthenium, for example, there is a process comprising adding a hydrolyzate of the ruthenium compound (e.g. ruthenium chloride, etc.) to a hydrolyzate of chloride, oxychloride, nitrate, oxynitrate, alkaline salt of oxy-acid, sulfate, alkoxide, etc. of titanium etc., filtering and washing the mixture, followed by calcining in air. Examples of the ruthenium compound include compounds described as examples of the catalyst obtained by supporting the ruthenium compound (e.g. ruthenium chloride, etc.) with the carrier. $RuCl_3$ and $RuCl_3$ hydrate are preferred. Preferred examples of the oxide for chemically-mixing with ruthenium oxide include titanium oxide, zirconium oxide, alumina, silica, titanium mixed oxide, zirconium mixed oxide, aluminum mixed oxide and silicon mixed oxide. As the process for supporting the ruthenium mixed oxide with the carrier, for example, there is a process comprising impregnating the carrier with chloride, nitrate, etc. of titanium and the ruthenium compound such as ruthenium chloride, followed by calcining in air. Examples of the carrier include titanium oxide, alumina, silica, zirconium oxide or a mixed oxide thereof. The amount of the ruthenium oxide contained in the ruthenium mixed oxide is usually from 0.1 to 80% by weight, preferably from 1 to 70% by weight. A third component can also be added, and examples of the third component include palladium compound, copper compound, chromium compound, vanadium compound, alkali metal compound, rare earth compound, manganese compound, alkaline earth compound, etc. The amount of the third component added is usually from 0.1 to 10% by weight based on the weight of the ruthenium mixed oxide.

Examples of the process for preparing the ruthenium mixed oxide include coprecipitation process, process due to mixing of precipitate, impregnation process, etc. The ruthenium mixed oxide is usually prepared by calcining at 200° to 1000° C. for about 1 to 5 hours.

Examples of the process for supporting the ruthenium mixed oxide on the carrier include impregnation process, precipitation supporting process, etc. The supported catalyst is usually calcined at 200° C. to 1000° C. for about 1 to 5 hours. It is preferably calcined at 300° C. to 500° C. Examples of the calcining atmosphere include nitrogen, air, etc.

Examples of the catalyst other than the above catalysts include ruthenium black prepared by a known process (see "Shokubai Chousei Kagaku", 1980, page 233, published by Kodan-sha), supported catalyst containing ruthenium (supporting rate: more than 20% by weight), etc.

According to the present invention, chlorine is produced by oxidation of hydrogen chloride with oxygen using a ruthenium catalyst. The reaction system in the production of chlorine is not specifically limited, but a flow system is preferred and a fixed bed gas phase flow system is more preferred. When the reaction temperature is high, the ruthenium oxide in the high oxidation state is sometimes volatilized and, therefore, the reaction is preferably conducted at lower temperature, more preferably from 100° C. to 500° C., most preferably from 200° C. to 380° C. Also, the reaction pressure is not specifically limited, but is preferably from about atmospheric pressure to 50 atm. As the oxygen raw material, air may be used as it is or pure oxygen may be used. Since other components are discharged simultaneously when an inherent nitrogen gas is discharged from the apparatus, pure oxygen containing no inherent gas is preferred. A theoretical molar amount of oxygen for hydrogen chloride is 1/4 mol, but oxygen is preferably supplied in a 0.1-fold to 10-fold amount, more preferably from 0.2-fold to 5-fold amount, for the theoretical amount. When the flow rate of the raw material, hydrogen chloride, to the catalyst is represented by GHSV under atmospheric pressure in the case of the fixed bed gas phase flow system, GHSV is preferably from about 10 $h^{-1}$ to 20000 $h^{-1}$, more preferably from about 20 $h^{-1}$ to 1000 $h^{-1}$.

It becomes possible to produce chlorine at low temperature, which is advantageous in view of equilibrium, by using the ruthenium catalyst having high activity. It also become possible to inhibit loss of an active component in the reaction due to volatilization of ruthenium, which has hitherto been considered to be a problem in the supported ruthenium catalyst, ruthenium oxide catalyst, catalyst obtained by supporting the ruthenium compound on the carrier, catalyst obtained by the process for preparing the ruthenium mixed oxide, and ruthenium black.

The following Examples and Comparative Examples further illustrate the present invention in detail but are not to be construed to limit the scope thereof.

EXAMPLE 1

A catalyst was prepared by the following process. That is, water (8.6 g) was charged in an ice-cooled flask, and commercially available titanium tetrachloride (7.6 g) was added dropwise with stirring to prepare an aqueous titanium tetrachloride solution. Then, a solution prepared by dissolving commercially available zirconium oxychloride octahydrate (13.1 g) in water (43.3 g) was added dropwise to the aqueous titanium tetrachloride solution with stirring to prepare a homogeneous solution. A solution prepared by adding 36% hydrochloric acid (1.1 g) to a solution of ammonium sulfate (13.4 g) and water (26.8 g) was poured into the above homogeneous solution, followed by stirring to prepare an homogeneous solution. Then, the homogeneous solution was heated to 70° C. and an aqueous 25 wt % ammonia solution (30.3 g) was slowly added dropwise with stirring. As the solution was added dropwise, a white precipitate was formed. After adding dropwise, the mixture was stirred at the same temperature for one hour. After stirring, the precipitate was filtered, washed with distilled water (300 ml) and then filtered again. After this operation was repeated three times, the resultant was suspended in water (150 ml). Then, a solution prepared by dissolving commercially available ruthenium chloride hydrate ($RuCl_3 \cdot nH_2O$) (9.74 g) in water (60 g) and a solution prepared by dissolving sodium hydroxide (5.2 g, content: 96%) in water (20 g) were mixed and stirred, after stirring, the mixed solution was immediately added dropwise to the suspension with stirring. Water (40 ml) was further added. After adding, a solution prepared by diluting 61 wt % nitric acid (2.2 g) with water (30 g) was added dropwise, followed by stirring at room temperature for one hour. After stirring, the black precipitate was filtered. The precipitate was washed with distilled water (300 ml) and then filtered again. After this operation was repeated three times, the resultant was dried at 60° C. for 4 hours to obtain 16.3 g of a black solid. This solid was grinded, heated in air from room temperature to 350° C. over 3.5 hours and then calcined at the same temperature for 3 hours to obtain 13.5 g of a black catalyst. According to the same manner as that described above, 55.4 g of the same catalyst was obtained. The calculated value of the content of the ruthenium oxide was 36% by weight. The resulting powder was granulated to obtain a ruthenium oxide-titanium oxide-zirconium oxide catalyst of 12 to 18.5 mesh.

The ruthenium oxide-titanium oxide-zirconium oxide catalyst (46.8 g) thus obtained was charged in a quartz glass reaction tube (inner diameter: 22 mm). A hydrogen chloride gas (19.0 ml/min.) and an oxygen gas (9.3 ml/min.) were respectively supplied under atmospheric pressure (converted on the basis of 0° C., 1 atm). The quartz glass reaction tube was heated with an electric furnace to adjust the inner temperature (hot spot) to 265° C. Six hours after the beginning of the reaction, the gas at the reaction outlet was sampled by passing it through an aqueous 30% potassium iodide solution, and then the amount of chlorine formed and amount of the non-reacted hydrogen chloride were respectively determined by iodometric titration and neutralization titration processs. As a result, the conversion of hydrogen hydrochloride was 95.9%.

EXAMPLE 2

The ruthenium oxide-titanium oxide-zirconium oxide catalyst which is the same as that used in Example 1 (2.5 g) was diluted by mixing sufficiently with a titanium oxide catalyst of 12 to 18.5 mesh (5 g), followed by charging in a quartz glass reaction tube (inner diameter: 12 mm). A hydrogen chloride gas (200 ml/min.) and an oxygen gas (200 ml/min.) were respectively supplied under atmospheric pressure (converted on the basis of 0° C., 1 atm). The quartz glass reaction tube was heated with an electric furnace to adjust the inner temperature (hot spot) to 301° C. 2.9 Hours after the beginning of the reaction, the gas at the reaction outlet was sampled by passing it through an aqueous 30% potassium iodide solution, and then the amount of chlorine formed and amount of the non-reacted hydrogen chloride were respectively determined by iodometric titration and neutralization titration processs. The catalyst activity of chlorine formation per unit weight of the catalyst determined by the following equation was $7.35 \times 10^{-4}$ mol/min g catalyst. The catalyst activity of chlorine formation per unit weight of catalyst (mol/min g catalyst)=amount of outlet chlorine formed (mol/min)/weight of catalyst (g).

EXAMPLE 3

A catalyst was prepared by the following process. That is, water (27.0 g) was charged in an ice-cooled flask, and commercially available titanium tetrachloride (14.3 g) was added dropwise with stirring to prepare an aqueous titanium tetrachloride solution. Water (1222 g) was added to the solution at room temperature, and then a solution of urea (27.6 g) and water (100 g) was poured into the solution, followed by stirring to prepare an homogeneous solution. Then, the homogeneous solution was stirred with heating to 100° C. for 2 hours. A white precipitate was formed gradually. Then, a solution of urea (3.2 g) and water (26 g) was added at the same temperature and, after stirring sufficiently, the precipitate was filtered. The precipitate was washed with distilled water (300 ml) and then filtered again. After this operation was repeated three times, the resultant was suspended in water (150 ml). Then, a solution prepared by dissolving commercially available ruthenium chloride hydrate ($RuCl_3 \cdot nH_2O$) (7.12 g) in water (54 g) and a solution prepared by dissolving sodium hydroxide (3.8 g, content: 96%) in water (20 g) were mixed and stirred, after stirring, the mixed solution was immediately added dropwise to the suspension with stirring. After adding dropwise, a solution prepared by diluting 61 wt % nitric acid (1.57 g) with water (24 g) was added dropwise, followed by stirring at room temperature for one hour. After stirring, the black precipitate was filtered. The precipitate was washed with distilled water (300 ml) and then filtered again. After this operation was repeated three times, the resultant was dried at 60° C. for 4 hours to obtain 9.3 g of a black solid. This solid was grinded, heated in air from room temperature to 350° C. over 3.5 hours and then calcined at the same temperature for 3 hours to obtain 8.1 g of a black catalyst. The calculated value of the content of the ruthenium oxide was 36% by weight. The resulting powder was granulated to obtain a ruthenium oxide-titanium oxide catalyst of 12 to 18.5 mesh.

According to the same reaction manner as that described in Example 2 except for charging the obtained ruthenium oxide-titanium oxide catalyst (1.9 g) in a quartz glass reaction tube and adjusting the inner temperature to 300° C., the reaction was carried out. The catalyst activity of chlorine formation per unit weight of the catalyst at the time at which 1.9 hours had passed since the beginning of the reaction was $9.05 \times 10^{-4}$ mol/min g catalyst.

EXAMPLE 4

A catalyst was prepared by the following process. That is, an aqueous 20 wt % (as $TiOSO_4$) titanium sulfate solution (54. 7 g, manufactured by Wako Junyaku Kogyo Co., Ltd.) was diluted with water (110.3 g). The resulting solution was charged in an ice-cooled flask, and an aqueous 25 wt % ammonia solution (48.2 g) was added dropwise with stirring. As a result, a white precipitate was formed gradually. After stirring at room temperature for 30 minutes, the precipitate was filtered. The precipitate was washed with distilled water (300 ml) and then filtered again. After this operation was repeated three times, the resultant was suspended in water (150 ml). Then, a solution prepared by dissolving commercially available ruthenium chloride hydrate ($RuCl_3 \cdot nH_2O$) (9.86 g) in water (61 g) and a solution prepared by dissolving sodium hydroxide (5.2 g, content: 96%) in water (20 g) were mixed and stirred, after stirring, the mixed solution was immediately added dropwise to the suspension with stirring. After adding dropwise, a solution prepared by diluting 61 wt % nitric acid (2.15 g) with water (30 g) was added dropwise, followed by stirring at room temperature for one hour. After stirring, the black precipitate was filtered, washed with distilled water (300 ml) and then filtered again. After this operation was repeated three times, the resultant was dried at 60° C. for 4 hours to obtain 12.0 g of a black solid. This solid was grinded, heated in air from room temperature to 350° C. over 3.5 hours and then calcined at the same temperature for 3 hours to obtain 9.9 g of a black catalyst. The calculated value of the content of the ruthenium oxide was 46% by weight. The resulting powder was granulated to obtain a ruthenium oxide-titanium oxide catalyst of 12 to 18.5 mesh.

According to the same manner as that described in Example 2 except for charging the obtained ruthenium oxide-titanium oxide catalyst (2.5 g) in a reaction tube and adjusting the inner temperature to 299° C., the reaction was conducted. The catalyst activity of chlorine formation per unit weight of the catalyst at the time at which 2.6 hours had passed since the beginning of the reaction was $7.35 \times 10^{-4}$ mol/min g catalyst.

EXAMPLE 5

A catalyst was prepared by the following method. That is, commercially avilable titanium tetrabutoxide (15.4 g) was disolved in ethanol (52 ml). Then, a solution prepared by dissolving commercially avilable ruthenium chloride hydrate ($RuCl_3 \cdot nH_2O$) (10.1 g) in water (122 ml) and a solution prepared by dissolving sodium hydroxide (14.8 g, content 96%) in water (60 ml) were mixed and stirred, after stirring, the mixed solution was immediately added dropwise to the ethanol solution of titanium tetrabutoxide with stirring. As the solution was added dropwise, a precipitate was formed. After adding, the black suspension was stirred at room temperature sufficiently. Then, a solution prepared by diluting 61 wt % nitric acid (25.7 g) with water (62 g) was added dropwise, followed by stirring at room temperature for one hour. After stirring, the black precipitate was filtered. Then, the black precipitate was washed with distilled water (300 ml) and then filtered again. After this operation was repeated three times, the resultant was dried at 60° C. for 4 hours to obtain 10.5 g of a black solid. This solid was grinded, heated in the air from room temperature to 350° C. over 3.5 hours and then calcined at the same temperature for 3 hours to obtain 8.4 g of a black catalyst. The calculated value of the content of the ruthenium oxide was 57% by weight. The resulting powder was granulated to obtain a ruthenium oxide-titanium oxide catalyst of 12 to 18.5 mesh.

According to the same reaction manner as that described in Example 2 except for charging the obtained ruthenium oxide-titanium oxide catalyst (2.5 g) in a quartz glass reaction tube and adjusting the inner temperature to 300° C., the reaction was carried out. The catalyst activity of chlorine formation per unit weight of the catalyst at the time at which 1.9 hours had passed since the beginning of the reaction was $7.7 \times 10^{-4}$ mol/min. g-catalyst.

EXAMPLE 6

Commercially available ruthenium oxide hydrate ($RuO_2$, manufactured by Aldrich Chemical Co.) was granulated to obtain a ruthenium oxide catalyst of 12 to 18.5 mesh.

According to the same manner as that described in Example 2 except for charging the obtained ruthenium oxide catalyst (2.5 g) in a reaction tube and adjusting the inner temperature to 300° C., the reaction was carried out. The catalyst activity of chlorine formation per unit weight of the catalyst at the time at which 1.5 hours had passed since the beginning of the reaction was $5.35 \times 10^{-4}$ mol/min. g-catalyst.

EXAMPLE 7

A 2 wt % spherical ruthenium-titanium oxide catalyst having a particle size of 3 mm$\phi$ (manufactured by N.E. Chemcat Co.) was grinded to adjust the particle size to 12 to 18.5 mesh. According to the same manner as that described in Example 2 except for charging this ruthenium-titanium oxide catalyst (2.5 g) in a reaction tube without diluting with a titanium oxide carrier, supplying a hydrogen chloride gas (190 ml/min.) and adjusting the inner temperature to 300° C., the reaction was conducted. The catalyst activity of chlorine formation per unit weight of the catalyst at the time at which 1.5 hours had passed since the beginning of the reaction was $1.38 \times 10^{-4}$ mol/min g catalyst.

EXAMPLE 8

The 2 wt % ruthenium-titanium oxide catalyst which is the same as that used in Example 7 was grinded to adjust the particle size to 12 to 18.5 mesh. According to the same manner as that described in Example 2 except for charging the catalyst (2.5 g) in a reaction tube without diluting with a titanium oxide carrier, supplying a hydrogen chloride gas (196 ml/min.) and an oxygen gas (170 ml/min.) and adjusting the inner temperature to 380° C., the reaction was conducted. The catalyst activity of chlorine formation per unit weight of the catalyst at the time at which 2 hours had passed since the beginning of the reaction was $11.4 \times 10^{-4}$ mol/min g catalyst.

EXAMPLE 9

A 2 wt % ruthenium-zirconium oxide catalyst (⅛ inch pellet, manufactured by N.E. Chemcat Co.) was grinded to adjust the particle size to 12 to 18.5 mesh. According to the same manner as that described in Example 2 except for charging this ruthenium-zirconium oxide catalyst (2.5 g) in a reaction tube without diluting with a titanium oxide carrier, supplying a hydrogen chloride gas (196 ml/min.) and an oxygen gas (170 ml/min.) and adjusting the inner temperature to 380° C., the reaction was conducted. The catalyst activity of chlorine formation per unit weight of the catalyst at the time at which 3 hours had passed since the beginning of the reaction was $7.9 \times 10^{-4}$ mol/min g catalyst. The residual hydrogen chloride flow was $4.7 \times 10^{-3}$ mol/min.

EXAMPLE 10

A 5 wt % ruthenium-alumina powder catalyst (manufactured by N.E. Chemcat Co.) was granulated to obtain a catalyst of 12 to 18.5 mesh. According to the same manner as that described in Example 2 except for charging this granulated ruthenium-aluminum catalyst (2.5 g) in a reaction tube without diluting with a titanium oxide carrier, supplying a hydrogen chloride gas (193 ml/min.) and adjusting the inner temperature to 380° C., the reaction was conducted. The catalyst activity of chlorine formation per unit weight of the catalyst at the time at which 10 hours had passed since the beginning of the reaction was $6.7 \times 10^{-4}$ mol/min g catalyst.

EXAMPLE 11

A catalyst was prepared by the following process. That is, silica AEROSIL 300 (18.70 g, manufactured by Nihon Aerosil Co., Ltd.) was suspended in an aqueous solution of commercially available ruthenium chloride hydrate ($RuCl_3$ $nH_2O$, 1.02 g) and water (80 g), and then the mixture was evaporated to dryness at 55 to 60° C. using a rotary evaporator and heated in a nitrogen flow at 150° C. for one hour to obtain 18.1 g of a green-black ruthenium chloride catalyst. The ratio of $RuCl_3$ to the carrier was 5% by weight. This catalyst was granulated to obtain a catalyst of 12 to 18.5 mesh.

According to the same manner as that described in Example 2 except for charging the resulting ruthenium chloride catalyst (5 g) in a reaction tube without diluting with a titanium oxide carrier, supplying a hydrogen chloride gas (194 ml/min.) and adjusting the inner temperature to 380° C., the reaction was conducted. The catalyst activity of chlorine formation per unit weight of the catalyst at the time at which 5 hours had passed since the beginning of the reaction was $5.9 \times 10^{-4}$ mol/min g catalyst.

COMPARATIVE EXAMPLE 1

A catalyst was prepared by the following process. That is, chromium nitrate enneahydrate (60.3 g) was dissolved in water (600 ml) and the solution was heated to 45° C. Then, 25 wt % ammonia water (64.9 g) was added dropwise over 1.5 hours with stirring, followed by stirring at the same temperature for additional 30 minutes. Water (3.3 liter) was added to the formed precipitate and, after standing overnight to cause sedimentation, the supernatant was removed by decantation. Then, water (2.7 liter) was added, followed by stirring sufficiently for 30 minutes. After the precipitate was washed by repeating this operation five times, the supernatant was removed by decantation. Then, 20 wt % silica sol (49 g) was added and, after stirring, the mixture was evaporated to dryness at 60° C. using a rotary evaporator. The resultant was dried at 60° C. for 8 hours and then dried at 120° C. for 6 hours to obtain a green solid. This solid was dried in a nitrogen flow at 120° C. for 6 hours and then cooled to room temperature to obtain a green solid. Then, this solid was calcined at 600° C. for 3 hours in the air and granulated to obtain a $Cr_2O_3$—$SiO_2$ catalyst of 12 to 18.5 mesh.

According to the same manner as that described in Example 2 except for charging the resulting $Cr_2O_3$—$SiO_2$ catalyst (2.5 g) in a reaction tube without diluting with a titanium oxide carrier, supplying a hydrogen chloride gas (192 ml/min.) and adjusting the inner temperature to 301° C., the reaction was conducted. The catalyst activity of chlorine formation per unit weight of the catalyst at the time at which 3.7 hours had passed since the beginning of the reaction was $0.19 \times 10^{-4}$ mol/min g catalyst.

COMPARATIVE EXAMPLE 2

According to the same manner as that described in Example 2 except for charging the $Cr_2O_3$—$SiO_2$ catalyst (2.5 g) used in Comparative Example 1 in a reaction tube without diluting with a titanium oxide carrier, supplying a hydrogen chloride gas (192 ml/min.) and adjusting the inner temperature to 380° C., the reaction was conducted. The catalyst activity of chlorine formation per unit weight of the catalyst at the time at which 5.8 hours had passed since the beginning of the reaction was $2.1 \times 10^{-4}$ mol/min g catalyst.

COMPARATIVE EXAMPLE 3

According to the same manner as that described in Example 2 except for charging the $Cr_2O_3$—$SiO_2$ catalyst (5 g) used in Comparative Example 1 in a reaction tube without diluting with a titanium oxide carrier, supplying a hydrogen chloride gas (96.5 ml/min.) and adjusting the inner temperature to 380° C., the reaction was conducted. The catalyst activity of chlorine formation per unit weight of the catalyst at the time at which 5 hours had passed since the beginning of the reaction was $2.7 \times 10^{-4}$ mol/min g catalyst.

What is claimed is:

1. A process for producing chlorine by oxidation of hydrogen chloride with oxygen which process comprises using a supported metal ruthenium catalyst which is prepared by supporting ruthenium on a carrier wherein the activity of chlorine formation using said supported metal ruthenium catalyst at a given reaction temperature between 100° C. to 500° C. is higher than the activity of chlorine formation using a ruthenium trichloride catalyst at the same reaction temperature.

2. A process for producing chlorine by oxidation of hydrogen chloride with oxygen which process comprises using a ruthenium oxide catalyst wherein the activity of chlorine formation using said ruthenium oxide catalyst at a given reaction temperature between 100° C. to 500° C. is higher than the activity of chlorine formation using a ruthenium trichloride catalyst at the same reaction temperature.

3. A process for producing chlorine by oxidation of hydrogen chloride with oxygen which process comprises using a catalyst obtained by a process for preparing a ruthenium mixed oxide wherein the activity of chlorine formation using said ruthenium mixed oxide catalyst at a given reaction temperature between 100° C. to 500° C. is higher than the activity of chlorine formation using a ruthenium trichloride catalyst at the same reaction temperature.

4. The process according to claim 1, wherein the carrier is at least one carrier selected from the group consisting of titanium oxide, alumina, zirconium oxide, zeolite, silica, titanium mixed oxide, zirconium mixed oxide and aluminum mixed oxide.

5. The process according to claim 1, wherein the carrier is at least one carrier selected from the group consisting of titanium oxide, zirconium oxide and alumina.

6. The process according to claim 1, wherein a content of ruthenium to the carrier is from 0.1 to 20% by weight.

7. The process according to claim 1, wherein a content of ruthenium to the carrier is from 1 to 5% by weight.

8. The process according to claim 2, wherein the ruthenium oxide catalyst is a ruthenium oxide and/or ruthenium hydroxide.

9. The process according to claim 2, wherein the ruthenium oxide catalyst is a supported ruthenium oxide catalyst.

10. The process according to claim 9, wherein the carrier is at least one carrier selected from the group consisting of titanium oxide, alumina, zirconium oxide, silica, titanium mixed oxide, zirconium mixed oxide, aluminum mixed oxide and silicon mixed oxide.

11. The process according to claim 9, wherein a ratio of ruthenium oxide to the carrier is from 0.1/99.9 to 70/30 by weight.

12. The process according to claim 3, wherein the catalyst obtained by the process for preparing the ruthenium mixed oxide is a catalyst which consists of at least one oxide selected from the group consisting of titanium oxide, zirconium oxide, alumina, silica, titanium mixed oxide, zirconium mixed oxide, aluminum mixed oxide and silicon mixed oxide, and ruthenium oxide.

13. The process according to claim 3, wherein the catalyst obtained by the process for preparing the ruthenium mixed oxide is a catalyst supported on at least one carrier selected from the group consisting of titanium oxide, zirconium oxide, alumina, silica, titanium mixed oxide, zirconium mixed oxide, aluminum mixed oxide and silicon mixed oxide.

14. The process according to claim 3, wherein the catalyst obtained by the process for preparing the ruthenium mixed oxide is a catalyst containing ruthenium oxide in an amount of 1 to 70% by weight.

15. The process according to claim 3, wherein the catalyst obtained by the process for preparing the ruthenium mixed oxide is a catalyst prepared by calcining at a calcining temperature of 300° to 500° C.

16. The process according to claim 1, wherein a reaction temperature of oxidation of hydrogen chloride with oxygen is from 100° to 500° C.

17. The process according to claim 1, wherein a reaction temperature of oxidation of hydrogen chloride with oxygen is from 200° to 380° C.

18. The process according to claim 1, wherein a reaction pressure of oxidation of hydrogen chloride with oxygen is from atmospheric pressure to 50 atm.

19. The process according to claim 1, wherein oxygen is pure oxygen.

20. The process according to claim 1, wherein a molar ratio of oxygen to hydrogen chloride is from 0.2 to 5.

21. The process according to claim 1, wherein a ratio of a volume of hydrogen chloride supplied per hour under atmospheric pressure to a volume of the catalyst which is set in the reactor (GHSV) is from 20 to 1000 $h^{-1}$.

22. The process according to claim 2, wherein a reaction temperature of oxidation of hydrogen chloride with oxygen is from 10° to 500° C.

23. The process according to claim 3, wherein a reaction temperature of oxidation of hydrogen chloride with oxygen is from 100° to 500° C.

24. The process according to claim 2, wherein a reaction temperature of oxidation of hydrogen chloride with oxygen is from 200° to 380° C.

25. The process according to claim 3, wherein a reaction temperature of oxidation of hydrogen chloride with oxygen is from 200° to 380° C.

26. The process according to claim 2, wherein a reaction pressure of oxidation of hydrogen chloride with oxygen is from atmospheric pressure to 50 atm.

27. The process according to claim 3, wherein a reaction pressure of oxidation of hydrogen chloride with oxygen is from atmospheric pressure to 50 atm.

28. The process according to claim 2, wherein oxygen is pure oxygen.

29. The process according to claim 3, wherein oxygen is pure oxygen.

30. The process according to claim 2, wherein a molar ratio of oxygen to hydrogen chloride is from 0.2 to 5.

31. The process according to claim 3, wherein a molar ratio of oxygen to hydrogen chloride is from 0.2 to 5.

32. The process according to claim 2, wherein a ratio of a volume of hydrogen chloride supplied per hour under atmospheric pressure to a volume of the catalyst which is set in the reactor (GHSV) is from 20 to 1000 $h^{-1}$.

33. The process according to claim 3, wherein a ratio of a volume of hydrogen chloride supplied per hour under atmospheric pressure to a volume of the catalyst which is set in the reactor (GHSV) is from 20 to 1000 $h^{-1}$.

* * * * *